United States Patent [19]
Onishi et al.

[11] Patent Number: 5,846,478
[45] Date of Patent: Dec. 8, 1998

[54] PROCESS FOR PRODUCING POLYAMIDE BLOW MOLDED PRODUCT

[75] Inventors: Koji Onishi, Kuwana-gun; Shiro Kataoka, Nagoya; Masatoshi Iwamoto, Ama-gun, all of Japan

[73] Assignee: Toray Industries, Inc., Japan

[21] Appl. No.: 841,842

[22] Filed: May 5, 1997

Related U.S. Application Data

[62] Division of Ser. No. 226,996, Apr. 13, 1994, Pat. No. 5,674,952, which is a division of Ser. No. 852,525, Mar. 17, 1992, abandoned.

[30] Foreign Application Priority Data

Mar. 18, 1991 [JP] Japan ........................................ 3-52875

[51] Int. Cl.$^6$ .............................. C08L 77/00; B29C 43/02
[52] U.S. Cl. .......................... 264/523; 264/537; 264/540; 525/66; 525/183
[58] Field of Search ...................... 525/66, 183; 264/576, 264/512, 514, 515, 523, 540, 537

[56] References Cited

U.S. PATENT DOCUMENTS

| | | | |
|---|---|---|---|
| 3,926,924 | 12/1975 | Edgar et al. ............................... | 528/324 |
| 4,128,599 | 12/1978 | Thomas et al. .......................... | 525/424 |
| 5,028,462 | 7/1991 | Matlack et al. ......................... | 428/35.7 |
| 5,436,294 | 7/1995 | Desio et al. ............................. | 525/66 |

*Primary Examiner*—Ana Woodward
*Attorney, Agent, or Firm*—Austin R. Miller

[57] ABSTRACT

A process for producing a molded product having excellent heat resistance, which including forming a composition including a crystalline polyamide by mixing together (a) 50–90% by weight of a hexamethylene adipamide component, (b) 5–40% by weight of a hexamethylene terephthalamide component, (c) 5–30% by weight of a hexamethylene isophthalamide component, components (a), (b) and (c) being based on the weight of the crystalline polyamide, and (d) 1–150 parts by weight of an elastomer, based upon 100 parts by weight of the crystalline polyamide; forming a melt polymer from the composition and applying shear to the melt polymer, the melting point (Tm) and crystallization temperature (Tc) of the crystalline polyamide being Tm$\geq$225° C. and Tc$\leq$230° C., respectively, and the melt viscosity of the crystalline polyamide varying greatly depending on the shear rate applied to the melt polymer and satisfying formulae (I) and (II):

$$2{,}000{,}000 \geq \mu a10 \geq 2{,}000 \tag{I}$$

$$\mu a10/\mu a1000 \geq 3.3 \tag{II}$$

wherein:

Tm: melting point of the polyamide (°C.)

$\mu a10$: melt viscosity at a temperature of Tm+20° C. and a shear rate of 10 (1/sec) (poise)

$\mu a1000$: melt viscosity at a temperature of Tm+20° C. and a shear rate of 1000 (1/sec) (poise); and forming a parison from the melt polymer and blow molding the parison to form the molded product.

11 Claims, No Drawings

PROCESS FOR PRODUCING POLYAMIDE BLOW MOLDED PRODUCT

This application is a divisional of application Ser. No. 08/226,996, filed Apr. 13, 1994, now U.S. Pat. No. 5,674,952 which is a divisional of application Ser. No. 07/852,525 filed Mar. 17, 1992 now abandoned.

BACKGROUND OF THE INVENTION

1. Field of the Invention

The present invention relates to a polyamide blow molded product having superior mechanical properties, chemical resistance and heat resistance, and more specifically, to a three-dimensionally curved polyamide blow molded product wherein the hollow molded product has a non-linear shape.

2. Description of the Related Art

As polyamides generally demonstrate little change in melt viscosity with respect to shear rate, various attempts have been made to obtain a blow molded product (see: Japanese Examined Patent Publication (Kokoku) No. 48-7509, Japanese Unexamined Patent Publication (Kokai) Nos. 50-2790, 50-2791, 50-3193, 50-104297, 52-32944, and 53-21252 and Japanese Examined Patent Publication (Kokoku) No. 55-41659).

Automotive parts are now required to have an increasingly lighter weight, for a conservation of energy, and accordingly, plastics are now commonly used as an alternative to metal. Moreover, since parts such as those located in the engine compartment are subjected to high temperatures (80°–130° C.), such parts are also required to have a good heat resistance.

Although Nylon 66 is generally used as a polyamide having a favorable heat resistance and able to be blow molded, due to the favorable crystallization and rapid crystallization rate of Nylon 66, solidification begins on the end of the parison when the parison is extracted, thus allowing only hollow molded products having incomplete shapes to be obtained.

As in the case of three-component copolyamides comprising hexamethylene terephthalamide (6T), hexamethylene isophthalamide (6I) and hexamethylene azipamide (66), it is known that polyamides in which aromatic units are introduced into the molecular chain have an improved heat resistance and chemical resistance (Japanese Unexamined Patent Publication (Kokai) Nos. 52-78298, 55-62958, 59-155426, 61-200123, 61-94842, 63-120645, 1-176555, and 3-7761 and Japanese Examined Patent Publication (Kokoku) Nos. 44-22214, 45-21116, 46-28218, 55-31206, and 55-41335, and Japanese Unexamined Patent Publication (Kokai) Nos. 52-132150, 61-618, 61-63785 and 63-308065).

Although increasing the composite ratio of the 6T component generally improves the heat resistance, due to the high crystallization temperature and rapid crystallization rate, a rapid solidification of the parison occurs, and accordingly, the blow moldability is not improved in comparison to Nylon 66. Further, when the composite ratio of the 6I component is increased, due to the low crystallization temperature and slow crystallization rate, a slow solidification of the parison occurs. Although this results in an improvement of the blow moldability, the heat resistance becomes poor due to a lowering of the melting temperature.

SUMMARY OF THE INVENTION

Accordingly, the objects of the present invention are to eliminate the above-mentioned disadvantages of the prior art and to provide a polyamide blow molded product obtained from a three-component polyamide comprising 6T, 6I and 66 and having a slow crystallization rate and a large dependency of the melt viscosity on the shear rate, without impairing the heat resistance.

Other objects and advantages of the present invention will be apparent from the following description.

In accordance with the present invention, there is provided a polyamide blow molded product comprising: a crystalline polyamide comprising (a) 50–90% by weight of a hexamethylene azipamide component, (b) 5–40% by weight of a hexamethylene terephthalamide component, and (c) 5–30% by weight of a hexamethylene isophthalamide component, wherein the melting point (Tm) and crystallization temperature (Tc) of the crystalline polyamide are Tm≧225° C. and Tc≦230° C., respectively.

In accordance with the present invention, there is also provided a polyamide blow molded product comprising: a crystalline polyamide comprising (a) 53–85% by weight of a hexamethylene azipamide component, (b) 15–40% by weight of a hexamethylene terephthalamide component, and (c) 5–20% by weight of a hexamethylene isophthalamide component; wherein the melting point (Tm) and crystallization temperature (Tc) of the crystalline polyamide are Tm≧240° C. and Tc≧230° C., respectively.

DESCRIPTION OF THE PREFERRED EMBODIMENTS

The inventors of the present invention conducted intensive studies into ways in which to obtain a polyamide having a slow crystallization rate, and a large dependency of the melt viscosity on the shear rate, as a material for blow molding, by lowering the crystallization rate without impairing the heat resistance for a three-component copolyamide comprising the components of 6T, 6I and 66.

As a result of the studies conducted to solve the above-mentioned problems, the inventors arrived at the present invention by discovering that copolyamides having a composition within a specific composition range are able to solve all of the above-mentioned problems.

Namely, the preferred embodiment of the present invention provides:

(1) a polyamide blow molded product comprising: a crystalline polyamide comprising (a) 50–90% by weight of a hexamethylene azipamide component, (b) 5–40% by weight of a hexamethylene terephthalamide component, and (c) 5–30% by weight of a hexamethylene isophthalamide component; wherein the melting point (Tm) and crystallization temperature (Tc) are Tm≧225° C. and Tc≦230° C., respectively; and wherein, when measured at a constant temperature of 20° C. higher than the melting point (Tm) of said polyamide (Tm+20° C.), the melt viscosity of said polyamide is such that:

$$2,000,000 \geq \mu a10 \geq 2,000 \quad (I)$$

and, $$\mu a10/\mu a1000 \geq 3.3 \quad (II)$$

wherein:

Tm: melting point of polyamide (°C.)

$\mu a10$: melt viscosity at a temperature of Tm+20° C. and a shear rate of 10 (1/sec) (poise)

$\mu$a1000: melt viscosity at a temperature of Tm+20° C. and a shear rate of 1000 (1/sec) (poise); and moreover, (2) a polyamide blow molded product comprising various polyamide compounds wherein a polyamide having the above-mentioned characteristics is mutually combined with a fibrous reinforcing material, elastomer, flame retarder, and so on; and wherein, when measured at a constant temperature of 20° C. higher than the melting point (Tm) of said polyamide (Tm +20° C.), the melt viscosity of said polyamide compound is such that:

$$2,000,000 \geq \mu a10 \geq 2,000 \qquad (I)$$

and, $$\mu a10/\mu a1000 \geq 3.3 \qquad (II)$$

wherein:

Tm: melting point of polyamide (°C.)

$\mu$a10: melt viscosity at a temperature of Tm+20° C. and a shear rate of 10 (1/sec) (poise)

$\mu$a1000: melt viscosity at a temperature of Tm+20° C. and a shear rate of 1000 (1/sec) (poise); and, (3) a polyamide blow molded product wherein a blow molded product has a three-dimensionally curved shape.

The polyamide usable in the present invention is a polyamide in which the components are adjusted within a component range of (a) 50–90% by weight of a component 66, (b) 5–40% by weight of component 6T and (c) 5–30% by weight of component 6I, and more preferably, (a) 53–85% by weight of component 66, (b) 15–40% by weight of component 6T and (c) 5–20% by weight of component 6I. When the amount of component 66 is less than 50% by weight, the resulting polyamide has a low degree of crystallinity and the balance between the properties thereof, such as a chemical resistance, is poor. When the amount of component 66 is more than 90% by weight, the crystallization temperature is more than 230° C., and thus a parison having a required length cannot be obtained during blow molding. Further, when the amount of component 6T is less than 5% by weight, the melting point of the resulting polyamide is lower than 255° C. resulting in a lower heat resistance and a poor balance between the properties thereof. When the amount of component 6T is more than 40% by weight, although the heat resistance is improved the crystallization temperature exceeds 230° C., and this promotes a solidification of the parison during blow molding. Moreover, when the amount of component 6I is less than 5% by weight, the resulting polyamide essentially becomes a 66/6T copolymer, and although the heat resistance is improved the crystallization temperature is more than 230° C., and this promotes a solidification of the parison during blow molding. When the amount of component 6I is more than 30% by weight, the melting point of the resulting polyamide is lowered due to the non-crystalline nature of the 6I component, which results in a loss of both the crystallinity and heat resistance thereof. Namely, the polyamide of the present invention is based on the design concept of lowering the crystallization temperature of Nylon 66 by introducing a component 6I, and compensating for the lowering in the heat resistance due to the introduction of component 6I, while also improving the blow moldability by the addition of a component 6T. When a design concept other than this is used, a polyamide that allows blow molding while maintaining a balance between properties cannot be obtained. Moreover, to obtain a polyamide satisfying the conditions of Tm$\geq$225° C., more preferably Tm$\geq$240° C., and further, Tc$\leq$230° C., detailed polymerization tests were conducted within the above-mentioned component ranges for the 66, 6T and 6I components, and thereafter, the Tm, Tc, and crystallinity of the resulting polyamides were measured with a differential scanning calorimeter (DSC), to determine the amounts of each component.

The polymerization methods used for the polyamide included melt polymerization, interfacial polymerization, solution polymerization, block polymerization, solid phase polymerization, and combinations thereof. Melt polymerization is generally most preferable. The raw materials of each of the components may be loaded into a polymerization oven in the form of 66, 6T and 6I salts, or in the form of respective monomers thereof.

Although there is no particular limit to the degree of polymerization of the polyamide used, a polyamide in which the relative viscosity, measured by dissolving 1 g of polymer in 100 ml of 98% concentrated sulfuric acid at 25° C., to be treated similarly hereinafter, is within 1.5 or more to less than 5 is preferable, based on the stable discharge from the polymerization oven. Further, the addition of monocarboxylic acid compounds, dicarboxylic acid compounds, monoamine compounds, diamine compounds and their derivatives as polymerization stabilizers to the polymerization oven, together with the monomers, followed by polymerization is an effective method of obtaining a stable discharge of the polymer from the polymerization oven. Examples of these compounds include acetic acid, benzoic acid, stearic acid, sebacic acid, adipic acid, didodecanic acid, undecanic acid, terephthalic acid, isophthalic acid, suberic acid, cyclohexane dicarboxylic acid, stearylamine, ethylenediamine, decamethylenediamine, tetramethylenediamine, and hexamethylenediamine.

Also, interrupting the polymerization at a low degree of polymerization can be used as a method of facilitating the stability when discharging the polymer from the polymerization oven. A low degree of polymerization refers to a relative viscosity ($\eta_r$) of 1.02–1.6. A solid phase polymerization or melt polymerization in a melt extruder is an effective means of converting polymers having a low degree of polymerization into polymers having a high degree of polymerization, with a relative viscosity ($\eta_r$) of 1.5–6.0.

The melting temperature of the polyamide used is 225° C. or higher, preferably 240° C. or higher. When the melting point is lower than 225° C., a desired heat resistance cannot be obtained. Although the upper limit of the melting point is not particularly specified, a temperature of 300° C. or less is preferable from the viewpoint of an easy manipulation thereof during polymerization and an easy molding. A crystallization temperature of 230° C. or lower effectively obtains a long parison. When this temperature is higher than 230° C., a solidification of the parison rapidly occurs, thus preventing the obtaining of a parison having a considerable length. Although there is no particular limit to the lower limit of the crystallization temperature, a temperature which allows crystallization at room temperature, i.e., a temperature of around 40° C., is generally considered preferable. Although there are no particular restrictions on the crystallinity, a semi-crystallization time also can be used in addition to a crystallization temperature, as a measure of the crystallization rate serving as a reference for obtaining a long parison. Where the polyamide is within the component ranges of the present invention, the semi-crystallization time as measured by DSC at a melting point of −20° C. is 400 seconds or more, and such a polyamide having a semi-crystallization time equal to or greater than this value can be used without difficulty.

In general, polyamides demonstrate small changes in melt viscosity with respect to the shear rate, i.e., have melt viscosity characteristics depending little on the shear rate. Consequently, when blow molding using a conventional screw type blow molding machine, although the raw material polymer is plasticized by the large shear rate in the screw, preferably the melt viscosity is low from the viewpoint of the motive power of the extruding machine, and of productivity. When forming a parison from a melted polymer, however, preferably the polymer has a high melt viscosity at low shear rates, to thus adequately maintain the shape of the polymer melt extruded from the nozzle and obtain a uniform dimension and wall thickness of the molded product. Thus, although most preferably the melt viscosity is high, to obtain large blow molded products having a favorable dimensional stability, this condition will not be satisfied if only the melt viscosity of the raw material polymer is high; the raw material polymer must satisfy the extremely important condition of a melt viscosity greatly dependent upon the shear rate.

The blow moldability of the polyamide raw material was determined by measuring the melt viscosity (poise) $\mu a10$ and $\mu a1000$ at shear rates of 10 (sec$^{-1}$) and 1000(sec$^{-1}$) and at a melting point of Tm+20° C., using a melt indexer manufactured in compliance with ASTM-D-1238. Preferably, the dependency of the melt viscosity on the shear rate is within the range stipulated in equations (I) and (II) below.

$$2,000,000 \geq \mu a10 > 2,000 \quad (I)$$

$$\mu a10/\mu a1000 \geq 3.3 \quad (II)$$

wherein:

Tm: melting point of polyamide (°C.)

$\mu a10$: melt viscosity at a temperature of (Tm+20° C.) and a shear rate of 10 (1/sec) (poise)

$\mu a1000$: melt viscosity at a temperature of (Tm+20° C.) and a shear rate of 1000 (1/sec) (poise); and preferably:

$$1,500,000 \geq \mu a10 > 3,000 \quad (I)$$

$$\mu a10/\mu a1000 \geq 4.0 \quad (II)$$

The copolyamide alone, as well as various types of polyamide compounds prepared from said copolyamide and additives such as a fibrous reinforcing material, elastomer, flame retarder, heat resisting agent, antioxidant or flame retarder assistant, may be applied to equations (I) and (II).

The addition of the fibrous reinforcing material used in the present invention is able to obtain a rigidity and a high thermal deformation temperature in the raw material polyamide compound. These fibrous reinforcing materials may be untreated or surface treated with a silane-based coupling agent such as triethoxy-γ-aminopropylsilane, N-β (aminoethyl)-γ-aminopropyltrimethoxysilane, vinyltriethoxysilane or γ-glycidoxypropyltrimethoxysilane having a favorable thermal stability. Also, two or more types of these fibrous reinforcing materials may be used. Moreover, in addition to a fibrous reinforcing material, inorganic fillers such as talc, kaolin, gypsum, mica, quartz, calcium carbonate, magnesium hydroxide, calcium phosphate, titanium phospate, sericite, anhydrous mica, wollastonite, diatomaceous earth, clay, white carbon, carbon black and zinc powder, may be added.

Preferably 1–200 parts by weight are blended, more preferably 10–100 parts by weight, of the fibrous reinforcing material of the present invention into 100 parts by weight of polyamide. When the blended amount of reinforcing material is 200 parts by weight or more, the characteristics of the polyamide cannot be demonstrated, resulting in an object different from that intended. When the blended amount of reinforcing material is 1 part by weight or less, however, the effects thereof as a reinforcing material cannot be demonstrated, and thus the object of obtaining a reinforced polyamide compound is not attained.

There are no particular restrictions on the method employed for mixing the polyamide and the fibrous reinforcing material, and conventional known methods can be employed. Examples of such methods include a method wherein the polyamide and fibrous reinforcing material are uniformly mixed in a high-speed stirrer followed by melting and kneading with an extruding machine having a required kneading capacity, a method wherein the components are kneaded directly in the molding machine at the time of blow molding, followed by such molding without first kneading a uniformly mixed mixture in an extruding machine, and a method wherein the fibrous reinforcing material is side fed into the extruding machine during the course of kneading.

There are no particular restrictions on the elastomer used in the present invention, as long as it is classified as an elastomer, and commercially available elastomers also can be used. Particularly useful examples thereof include ionomer resins and modified Polyalefins.

Examples of ionomer resins include ethylene-based ionomer resins wherein a metal ion having a valency of 1–3 is added to a copolymer of an α-olefin containing ethylene, and an α,β-unsaturated carboxylic acid. Typical examples of such α,β-unsaturated carboxylic acids include acrylic acid, methacrylic acid and itaconic acid, and typical examples of metal ions having a valency of 1–3 include Na$^+$, Ca$^{++}$, Zn$^{++}$ and Al$^{+++}$. Preferably, Na$^+$, Zn$^{++}$ and Al$^{+++}$ are used.

Examples of preferably used modified polyolefins include modified polyolefins obtained by introducing at least one type of modifier selected from maleic acid, fumaric acid, itaconic acid, acrylic acid, crotonic acid and their anhydrides or derivatives, maleimide and epoxy compounds, into a polyolefin obtained by radical polymerization of at least one type of olefin selected from ethylene, propylene, butene-1, butadiene, isoprene, 1,3-pentadiene, pentene-1, 4-methylpentene-1, isobutylene, 1,4-hexadiene, dicyclopentadiene, 2,5-norbornene, 5-ethylidenenorbornene, 5-ethyl-2,5-norbornadiene, 5-(1'-propenyl)-2-norbornene, styrene, α-methylstyrene and vinyltoluene.

Examples of such modified polyolefins include styrene/ethylene-butylene/styrene-g-maleic anhydride block copolymers (written as styrene/butadiene/ styrene-g-maleic anhydride block copolymer hydrides) and styrene/isoprene-g-maleic anhydride block copolymers obtained by grafting maleic anhydride following a hydrogenation of ethylene/ethyl acrylate-g-maleic anhydride copolymer, ethylene/ethyl methacrylate-g-maleic anhydride copolymer, ethylene/ethyl acrylate-g-maleimide copolymer, ethylene/ethyl acrylate-g-N-phenylmaleimide copolymer, ethylene/propylene-g-maleic anhydride copolymer, ethylene/butene-1-g-maleicmaleic anhydride copolymer, ethylene/propylene/1,4-hexadiene-g-maleic anhydride copolymer, ethylene/propylene/dicyclopentadiene-g-maleic anhydride copolymer, ethylene/propylene2,5-norbornadiene-g-maleic anhydride copolymer, ethylene/propylene-g-N-phenylmaleimide copolymer, ethylene/butene-1-g-N-phenylmaleimide copolymer, ethylene/glycidylacrylate copolymer, ethylene/glycidylmethacrylate copolymer, styrene/butadiene/styrene-g-maleic anhydride block copolymer and stryene/butadiene/styrene block copolymer (wherein "g" represents a graft). Preferable examples include ethylene/ethylacrylate-g-maleic anhydride copolymer, ethylene/propylene-g-maleic anhydride copolymer, ethylene/propylene/1,4-hexadiene-g-maleic anhydride copolymer, ethylene/ propylene-g-N-phenylmaleimide copolymer, styrene/butadiene/styrene-g-maleic anhydride block copolymer, styrene/butadiene/styrene-g-maleic anhydride block copolymer hydride and ethylene/glycidylmethacrylate copolymer.

The amount of modifier added is preferably 0.001–40 mol %, more preferably 0.05–20 mol %, based upon the polyolefin.

One or more types of the above-mentioned elastomer may be mixed and used at any ratio. The amount of elastomer added is 1–150 parts by weight, preferably 5–100 parts by weight, based upon 100 parts by weight of polyamide. When the blended amount of elastomer is less than 1 part by weight, the increase of the dependency of the melt viscosity of the mixture on the shear rate is conspicuously reduced and a blow molded product having a superior impact resistance cannot be obtained. When the blended amount of elastomer exceeds 150 parts by weight, however, the heat resistance is lowered and the characteristics of the polyamide cannot be demonstrated, resulting in an object different from the intended object in the form of a polyamide-based plastic blow molded product. The mean particle size of the elastomer dispersed in the polyamide matrix is preferably 20 microns or less, more preferably 0.01–10 microns, to ensure an increased impact resistance.

The flame retarder usable in the present invention is magnesium hydroxide, brominated polyphenylene ether, brominated polystyrene and a polydibrominated styrene obtained by polymerizing dibrominated styrene. The magnesium hydroxide is preferably in the form of a powder, 95% by weight or more of which is fibrous, having a diameter of 20 microns or less and a particle size of 4 microns or less. Moreover, preferably the surface of the magnesium hydroxide powder is treated with at least one type of silane-based coupling agent such as triethoxy-γ-amino-propylsilane, vinyltriethoxysilane, N-β(aminoethyl)-γ-amino propyltrimethoxy-silane and γ-glycidoxypropyltrimethoxysilane.

The bromine content and the weight average molecular weight of the flame retarder consisting of polydibrominated styrene (V) obtained by polymerization of dibrominated styrene, brominated polyphenylene ether (III) and brominated polystyrene (IV) as indicated in the following structural formulae, are preferably 50–70% and 5,000–1,000,000, respectively.

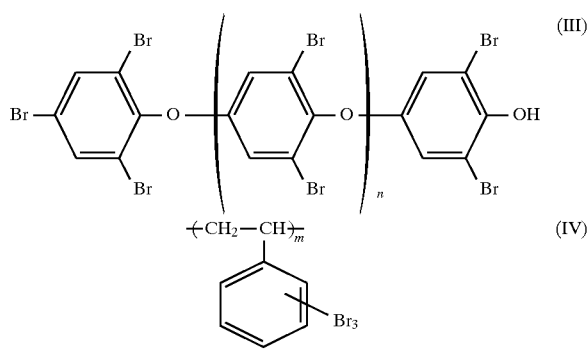

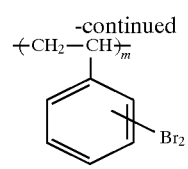

wherein, n represents an integer of from 2–400 and m represents an integer of from 20–3500.

The above-mentioned flame retarder may be used independently or in the form of a mixture, and the amount added is 5–200 parts by weight, more preferably 7–150 parts by weight, based upon 100 parts by weight of polyamide. When the amount added is less than 5 parts by weight, the flame retarding effects are poor, and when the amount added is more than 200 parts by weight, a lowering of the mechanical properties of the resin compound occurs.

The flame retarder assistant usable in the present invention is selected from antimony trioxide, zinc oxide, ferrous oxide, ferric oxide, stannous oxide, stannic oxide and zinc borate; these may be used independently or in the form of a mixture of two or more types thereof, and the amount added is 1–50 parts by weight, preferably 2–20 parts by weight, based upon 100 parts by weight of polyamide. When the amount added is less than 1 part by weight, the flame retarding properties are poor, and when the amount added exceeds 50 parts by weight, a lowering of the mechanical properties of the polyamide compound occurs.

The halogen capturing agent usable in the present invention is particularly effective when using a halogen-based flame retarder. At least one type of compound selected from calcium carbonate, magnesium oxide, an organophosphate compound and hydrotalcite compounds is used for the halogen capturing agent. The organophosphate compound is a mixed sodium and barium organophosphate, and $Mg_{4.5}Al_2(OH)_{13}CO_3 \cdot 3.5H_2O$, $Mg_{4.2}Al_2(OH)_{12.4}CO_3$ and $Mg_{0.7}Al_{0.3}O_{1.15}$ are preferably used for the hydrotalcite compounds.

Halogen capturing agents prevent a corrosion of metal by capturing halogen ions or halogen compounds produced from halogen-based flame retarders and so on. These agents also remarkably reduce the production of gas, foaming and polymer coloring during molding. The added amount of halogen capturing agent is 0–20 parts by weight, preferably 0.01–10 parts by weight, particularly when using halogen-based flame retarders. When a halogen capturing agent is not added when using a halogen-based flame retarder, metal corrosion and a foul odor will occur. Further, when the amount of halogen capturing agent added is more than 20 parts by weight, the mechanical properties of the polyamide compound will be impaired.

It is preferable to add the heat resistant improver usable in the present invention to prevent a deterioration of the molded product during the melting of the polyamide, elastomer and flame retarder, and when in a hightemperature environment. At least one type of compound selected from copper acetate, copper iodide, copper chloride, copper bromide, potassium iodide, potassium chloride, sodium hypophosphite, 2,6-di-tert-butyl-4-methyl phenol, n-octadecyl-3-(3',5'-di-tert-butyl-4'-hydroxyphenyl)-propionate, 2-tert-butyl-6-(3'-tert-butyl-5'-methyl-2'-hydroxybenzyl)-4-methylphenyl acrylate, tetrakis-[methylene-3-(3',5'-di-tert-butyl-4'-hydroxyphenyl) propionate]-methane, 3,9-bis[2-[3-(3-tert-butyl-4-hydroxy-5-methylphenyl)propionyloxy]-1,1-dimethylethyl]-2,4,8,10-tetraoxaspiro[5,5]undecane, N,N'-hexamethylene-bis-(3,5-di-tert-butyl-4-hydroxy-hydrocinnamid), 1,3,5-trimethyl-2,4,6-tris(3,5-di-tert-butyl-4-hydroxybenzyl)benzene, N,N'- bis-[3-(3,5-di-tert-butyl-4-hydroxyphenyl)propionyl] hydrazine, tris-(2,4-di-tert-butylphenyl)phosphite, pentaerythritol-tetrakis-(β-lauryl-thiopropionate), 2-(3-tert-butyl-5-methyl-2-hydroxyphenyl)-5-chlorobenzotriazol, 2-[2-hydroxy-3,5-bis(α,α-dimethylbenzyl)phenyl]-2H-benzotriazol, succinic acid-di-methyl-1-(2-hydroxyethyl)-4-hydroxy-2,2,6,6-tetra-methylpiperidine polycondensate (molecular weight: 3,000–4,000), poly[{6-(1,1,3,3-tetra-methylbutyl)imino-1,3,5-triazine-2,4-di-il}{2,2,6,6-tetra-methyl-4-piperizilimino}hexamethylene{2,2,6,6-tetra-methyl-4-piperizilimino}](molecular weight: 2,500–4,000), N,N'-bis(3-aminopropyl)ethylenediamine/2,4-bis[N-butyl-N-(1,2,2,6,6-penta-methyl-4-piperizil)amino]-6-chloro-1,3, 5-triazine condensate (molecular weight: 2,000–3,000), 2,2-methylene-bis[4-(1,1,3,3-tetra-methylbutyl)-6-(2H-benzotriazol-2-il)phenol], 2,2-methylene-bis(4,6-di-tert-butylphenyl)octylphosphite, and bis(2,6-di-tert-butyl-4-methylphenyl)penta-erythritol-diphosphite is preferably used for the heat resistant improver.

The added amount of heat resistant improver is preferably 0.001–20 parts by weight, more preferably 0.01–10 parts by weight, based upon 100 parts by weight of polyamide. When the added amount is less than 0.001 parts by weight the desired heat resistance improvement effects, are not demonstrated, and an amount in excess of 20 parts by weight has a detrimental effect on the properties of the raw material and provides no change in the effects thereof as a heat resistant improver.

The polyamide blow molded product of the present invention is a hollow molded product having an inner diameter of 5 mm or more, a length of 100 mm or more, and a non-linear shape; the hollow molded product having a three-dimensionally curved shape.

Also, other components such as pigments, crystal promoters, lubricants, mold releasing agents and so on can be added and introduced into the blow molded product of the present invention, as long as such components do not impair the moldability and physical properties of the blow molded product.

EXAMPLES

The present invention will now be further illustrated by, but is by no means limited to, the following Examples. Note, the impact resistance of the blow molded products of the preferred embodiments and comparative examples was evaluated according to the following methods:

(1) Melt viscosity:
  Measured using a melt indexer manufactured in compliance with ASTM-D-1238.
(2) Flame Resistance:
  Measured in accordance with UL-94 standards stipulated by Underwriters Laboratories of the U.S., molding a testpiece 5 inches in length, ½ inch wide and 1/16 inch thick.
(3) Elastomer Dispersed Particle Size:
  Observed under an electron microscope after cutting off a portion of the molded product, slicing same into thin sections with a microtome, and staining.
(4) Three-Dimensional Blow Moldability:
  Evaluated by molding a parison having an outer diameter of 20 mmφ and a wall thickness of 4 mm, using a blow molding machine equipped with an accumulator and a three-dimensional blow molding machine, and then evaluating the shape of the molded product of a complex shaped pipe having an outer diameter of 50 mm and a length of 800 mm.
(5) Thermal Stability:
  The melt residual stability was evaluated according to the appearance of the parison and the production of gas during the three-dimensional blow molding.
(6) Polyamide Melting Point (Tm) and
  Crystallization Temperature (Tc)
  The temperature at which the peak value is demonstrated on a melting curve obtained by measuring 8–10 mg of sample at a heating rate of 20° C./min using a DSC (Perkin-Elmer Model 7) was taken to be the melting temperature (Tm). Further, the temperature at which the peak value is demonstrated on a crystallization curve obtained by maintaining 8–10 mg of sample at a temperature of (T+20° C.) for 5 minutes, while heating at a heating rate of 20° C./min followed by cooling to a temperature of 30° C. at a cooling rate of 20° C./min, was taken to be the crystallization temperature (Tc).
(7) Izod Impact Strength:
  Measured in compliance with ASTM-D256.
(8) Heat Deformation Temperature (HDT)
  Measured in compliance with ASTM-D648, under a load of 4.6 kgf/cm$^2$ and a load of 18.6 kgf/cm$^2$.

EXAMPLE 1

Each of the monomers of component 66 (raw material: hexamethylenediamine/adipic acid), component 6T (raw material: hexamethylenediamine/terephthalic acid) and component 6I (raw material: hexamethylenediamine/isophthalic acid) were weighed to obtain the composition shown in Table 1, placed in a polymerization oven, and melt polymerized to form a polymer. Following the completion of the polymerization, the polymer was discharged from the bottom of the polymerization oven, pulled into strands, and then formed into pellets by using a pelletizer. The characteristics of these pellets after drying in a vacuum were as follows:

Melting Point (Tm): 260° C.

Crystallization Temperature (Tc): 226° C.

Melt Viscosity $\mu$a10: 3200 (poise)

Following a solid phase polymerization of this polyamide with a double-cone vacuum drier, a polyamide was obtained having a melt viscosity at a temperature of 280° C. and a shear rate of 10 sec$^{-1}$ of $\mu$a10=62,000 poise. Then, 0.03 parts by weight of CuI and 0.2 parts by weight of KI were respectively added, with respect to 100 parts by weight of polyamide, to the pellets as a heat resistance improver. After blending with a blender, pellets were formed afterkneading with a melting extruding machine having a diameter of 30 mm. After vacuum drying these pellets, the melt viscosities at shearing rates of 10 sec$^{-1}$ and 1000 sec$^{-1}$ ($\mu$a10 and $\mu$a1000, respectively) were measured at a temperature of 280° C., using a melt indexer manufactured in compliance with ASTM-D-1238. This yielded values of $\mu$a10=63,000 poise and $\mu$a1000=8,000 poise, both these values satisfying equations (I) and (II).

Next, when the resulting pellets were used to mold a parison having an outer diameter of 20 mm and a wall thickness of 2 mm at a temperature of 280° C., using a blow molding machine equipped with an extruding machine having a diameter of 40 mmφ, the parison was observed to be completely free of sagging and blow molding was easily executed, allowing a molded product having a uniform wall thickness to be obtained. When a portion of this molded product was cut off, and the physical properties thereof measured, the results indicated in Table 1 were obtained.

A parison having an outer diameter of 20 mmφ and a wall thickness of 2 mm was then molded, using the same materials and same blow molding machine, into a complex shape pipe having an outer diameter of 50 mm and a length of 700 mm, using a three-dimensional blow molding machine having a three-dimensional curved shape. This material was able to be molded into a shape matching mold dimensions and having a good appearance, without any solidification of the end of the parison.

EXAMPLES 2–12

The polyamides having the composite ratios indicated in Table 1 were polymerized by same method as used in Example 1, to obtain polyamides having the characteristics shown in Table 1. A high polymerization was performed by the same method as used in Example 1.

After blending these high polymerization polyamides with the additives indicated in the compound column of Table 1, using a blender, the compounds were extruded by a dual-shaft melting extruding machine having a screw diameter of 30 mm$\phi$, to prepare the compounds having the compound properties shown in Table 1. These compounds were then blow molded, using the same procedure as in Example 1, followed by an evaluation of the characteristics of the molded products. The results are shown in Table 1.

When a fibrous reinforcing material and an elastomer were added the melt viscosity of the compound was increased whereby the conditions for an increase of the degree of polymerization of the polyamide became milder and the dependency of the melt viscosity on the shear rate increased, allowing the preparation of a material able to be advantageously used for blow molding.

COMPARATIVE EXAMPLE 1

Monomers were weighed to provide a composition of 40 wt % of component 66, 24 wt % of component 6T, and 36 wt % of component 6I, and the monomers were then placed in a polymerization oven to obtain a polymer by a melt polymerization. The polyamide of this composition provided a copolyamide with no heat resistance and having a low melting point of 210° C.

COMPARATIVE EXAMPLES 2–9

Polymers formed by a melt polymerization had the compositions indicated in Table 2 for component 66, component 6T, and component 6I. After a high polymerization of the polyamides, using a procedure similar to that of Example 1, and then blending same with the compounds shown in Table 2, a melting and kneading, and an evaluation of the molding, were performed in the same manner as in Example 1, and the results shown in Table 2 were obtained. All of the blow molded products of the polyamides used here demonstrated a rapid solidification of the parison and a poor moldability. Furthermore, in the case of compounds to which a flame retarder agent was added, the flame retarder produced a foul odor.

TABLE 1

| | Unit | Ex. 1 | Ex. 2 | Ex. 3 | Ex. 4 | Ex. 5 | Ex. 6 |
|---|---|---|---|---|---|---|---|
| Polyamide | Composition | 66/6T/6I | 66/6T/6I | 66/6T/6I | Same as left | 66/6T/6I | 66/6T/6I |
| Polyamide composition ratio | (wt %) | 60/30/10 | 55/30/15 | 60/30/10 | | 55/30/15 | 60/30/10 |
| Melting point (Tm) | °C. | 260 | 250 | 260 | " | 250 | 260 |
| Crystallization temp. (Tc) | " | 226 | 200 | 226 | | 200 | 226 |
| Melt viscosity $\mu$a10 | Poise | 62000 | 58000 | 9000 | 9000 | 9000 | 60000 |
| $\mu$a10 of polymer discharged from polymerization vessel following high polymerization | " | 3200 | 3500 | 3200 | 3200 | 3500 | 3200 |
| Composition | Wt. part | 100 | 100 | 100 | 100 | 100 | 100 |
| Polyamide compounded amount | | | | | | | |
| Type of fibrous reinforcing material* | " | — | GF | — | — | GF | — |
| Amount | | | 40 | | | 40 | |
| Type of elastomer *2 | " | — | — | SEBS | HM1706 | GMA-PE | — |
| Amount | | | | 20 | 20 | 20 | |
| Type of flame retardar *3 | " | — | — | — | — | — | P—BrSt |
| Amount | | | | | | | 28 |
| Type of flame retarder assistant *4 | " | — | — | — | — | — | Sb$_2$O$_3$ |
| Amount | | | | | | | 6 |
| Type of ion capturing agent *5 | " | — | — | — | — | — | DHT-4A |
| Amount | | | | | | | 0.3 |
| Type of heat resistant improver *6 | " | CuI/KI | Irganox1098 | CuI/Irganox1098 | CuI/Irganox1098 | CuI/KI | CuI/KI |
| Amount | | 0.03/0.5 | 0.3 | 0.03/0.2 | 0.03/0.2 | 0.03/0.2 | 0.03/0.2 |
| Melt viscosity $\mu$a10 | Poise | 63000 | 78500 | 90000 | 85000 | 110000 | 62000 |
| Melt viscosity $\mu$a1000 | " | 8000 | 8500 | 9500 | 9000 | 9000 | 8000 |
| $\mu$a10/$\mu$a1000 | | 7.9 | | 9.5 | 9.4 | 12.2 | 7.7 |
| Molded product characteristic | | | | | | | |
| Blow Moldability | | Good | Good | Good | Good | Good | Good |
| Molded Product Appearance | | " | " | " | " | " | " |
| Foul Odor During Molding | | None | None | None | None | None | None |
| Elastomer Mean Particle Size | $\mu$m | — | — | 0.8 | 1.2 | 1.0 | — |
| Izod Impact Strength (notched) | kgf cm/cm | 5 | 10 | 55 | 18 | 43 | 5 |
| HDT (18.6 kgf/cm$^2$) | °C. | 80 | 220 | 80 | 80 | 210 | 85 |
| (4.6 kgf/cm$^2$) | °C. | 215 | 245 | 200 | 195 | 240 | 210 |
| Flame Resistance | UL-94 | HB | HB | HB | HB | HB | V-0 |
| | Unit | Ex. 7 | Ex. 8 | Ex. 9 | Ex. 10 | Ex. 11 | Ex. 12 |
| Polyamide | Composition | 66/6T/6I | 66/6T/6I | Same as left | 66/6T/6I | | |
| Polyamide composition ratio | (wt %) | 55/30/10 | 60/30/10 | | 60/30/10 | | |
| Melting point (Tm) | °C. | 250 | 260 | " | 260 | | |
| Crystallization temp. (Tc) | " | 200 | 226 | | 226 | | |
| Melt viscosity $\mu$a10 | Poise | 62000 | 60000 | 60000 | 62000 | 60000 | 60000 |

TABLE 1-continued

|  | | | | | | | |
|---|---|---|---|---|---|---|---|
| μa10 of polymer discharged from polymerization vessel following high polymerization | " | 3500 | 3200 | 3200 | 3200 | 3200 | 3200 |
| Composition Polyamide compounded amount | Wt. part | 100 | 100 | 100 | 100 | 100 | 100 |
| Type of fibrous reinforcing material* Amount | " | — | GF 30 | — | — | GF 50 | GF 50 |
| Type of elastomer *2 Amount | " | — | — | H1706 20 | MP-0610 20 | HM1706 30 | SEBS 30 |
| Type of flame retardar *3 Amount | " | Mg(OH)$_2$ 67 | Br—PPO 30 | Br—PPO 28 | P—BrSt 35 | Br—PSt 32 | Br—PPO 30 |
| Type of flame retarder assistant *4 Amount | " | C.B 1.7 | Sb$_2$O$_3$ 7 | Sb$_2$O$_3$ 6 | Sb$_2$O$_3$ 8 | Sb$_2$O$_3$ 8 | Sb$_2$O$_3$ 6 |
| Type of ion capturing agent *5 Amount | " | KW-2000 0.5 | KW-2000 0.3 | KW-2000 0.3 | DHT-4A 0.3 | DHT-4A 0.5 | KW-2000 0.3 |
| Type of heat resistant improver *6 Amount | " | CuI/Irganox1098 0.03/0.2 | Irganox1098 0.2 | Irganox1098 0.3 | CuI/Irganox 1098 0.03/0.2 | CuI/Irganox 1098 0.03/0.2 | CuI/Irganox 1098 0.03/0.2 |
| Melt viscosity μa10 | Poise | 65000 | 75000 | 92000 | 82000 | 90000 | 96000 |
| Melt viscosity μa1000 | " | 9000 | 8500 | 9000 | 9000 | 9500 | 9500 |
| μa10/μa1000 | | 7.2 | 8.8 | 10.2 | 9.1 | 9.5 | 10.1 |
| Molded product characteristic | | | | | | | |
| Blow Moldability | | Good | Good | Good | | | |
| Molded Product Appearance | | " | " | " | | | |
| Foul Odor During Molding | | None | None | None | | | |
| Elastomer Mean Particle Size | μm | — | — | 1.6 | 1.5 | 1.8 | 1.7 |
| Izod Impact Strength (notched) | kgf cm/cm | 5 | 10 | 15 | 15 | 20 | 22 |
| HDT (18.6 kgf/cm$^2$) | °C. | 110 | 210 | 85 | 85 | 215 | 215 |
| (4.6 kgf/cm$^2$) | °C. | 225 | 240 | 210 | 210 | 245 | 245 |
| Flame Resistance | UL-94 | V-0 | V-2 | V-2 | V-0 | V-2 | V-2 |

Notes of Table 1
*1) GF: Glass fiber
*2) SEBS: Styrene/butadiene/styrene-g- maleic anhydride block copolymer hydride
HM1706: Ionomer (zinc salt of an ethylene/methacrylate copolymer)
CMA-PE: Ethylene/glycidylmethacrylate copolymer
MP0610: Ethylene/propylene-g-maleic anhydride copolymer
*3) P—BrSt: Polydibrominated styrene
Mg(OH)$_2$: Magnesium hydroxide
Br—PPO: Brominated polyphenylene ether
Br—PSt: Brominated polystyrene
*4) Sb$_2$O$_3$: Antimony trioxide
CB: Carbon black
*5) DHT-4A: Mg$_{4.5}$Al$_2$(OH)$_{13}$CO.3.5H$_2$O
KW-2000: Mg$_{0.7}$Al$_{0.3}$O$_{1.15}$
*6) CuI/KI: Copper iodide/potassium iodide
Irganox 1098: N,N'-hexamethylene(3,5-di-tert-butyl-4-hydroxyhydrocinnamid)

TABLE 2

|  | Unit | Comp. Ex. 1 | Comp. Ex. 2 | Comp. Ex. 3 | Comp. Ex. 4 |
|---|---|---|---|---|---|
| Polyamide | Composition | 66/6T/6I | 66/6T/6I | Same as left | 66/6T/6I |
| Polyamide composition ratio | (wt %) | 40/24/36 | 50/45/5 | " | 50/45/5 |
| Melting point (Tm) | °C. | 210 | 287 | " | 287 |
| Crystallization temp. (Tc) | " | 135 | 251 | " | 251 |
| Melt viscosity μa10 | Poise | — | 3100 | | 3100 |
| μa10 of polymer discharged from polymerization vessel following high polymerization | " | — | 61000 | | 9000 |
| Composition Polyamide compounded amount | Wt. part | — | 100 | 100 | 100 |
| Type of fibrous reinforcing material* Amount | " | — | — | GF 40 | — |
| Type of elastomer *2 Amount | " | — | — | — | SEBS 20 |
| Type of flame retardar *3 Amount | " | — | — | — | — |
| Type of flame retarder assistant *4 Amount | " | — | — | — | — |
| Type of ion capturing agent *5 Amount | " | — | — | — | — |
| Type of heat resistant improver *6 Amount | " | — | CuI/KI 0.03/0.5 | Irganox1098 0.3 | CuI/Irganox1098 0.03/0.2 |

TABLE 2-continued

|  | | | | | |
|---|---|---|---|---|---|
| Melt viscosity μa10 | Poise | — | 61000 | 78000 | 85000 |
| Melt viscosity μa1000 | " |  | 8000 | 8500 | 9000 |
| μa10/μa1000 |  |  | 7.8 |  |  |
| Molded product characteristic |  |  |  |  |  |
|  |  |  |  |  |  |
| Blow Moldability |  |  | Poor | Poor | Poor |
| Molded Product Appearance |  | — | " | " | " |
| Foul Odor During Molding |  |  | None | None | None |
| Elastomer Mean Particle Size | μm | — | — | — | 1.0 |
| Izod Impact Strength (notched) | kgf cm/cm |  | 5 |  |  |
| HDT (18.6 kgf/cm²) | °C. | — | — | — |  |
| (4.6 kgf/cm²) | °C. |  |  |  | — |
| Flame Resistance | UL-94 | — | — | — | — |

| | Unit | Comp. Ex. 5 | Comp. Ex. 6 | Comp. Ex. 7 | Comp. Ex. 8 | Comp. Ex. 9 |
|---|---|---|---|---|---|---|
| Polyamide Composition | Composition | 66/6T/6I | 66/6T/6I | 66/6T/6I | Same as left | Same as left |
| Polyamide composition ratio | (wt %) | 50/45/5 | 45/45/10 | 45/45/10 |  |  |
| Melting point (Tm) | °C. | 287 | 280 | 280 | " | " |
| Crystallization temp. (Tc) | " | 251 | 235 | 235 |  |  |
| Melt viscosity μa10 | Poise | 3100 | 3000 | 3000 | " | 3000 |
| μa10 of polymer discharged from polymerization vessel following high polymerization | " | 9000 | 60000 | 6000 |  | 9000 |
| Composition Polyamide compounded amount | Wt. part | 100 | 100 | 100 | 100 | 100 |
| Type of fibrous reinforcing material* Amount | " | GF 40 | — | — | GF 30 | GF 50 |
| Type of elastomer *2 Amount | " | GMA-PE 20 | — | HM1706 20 | — | HM1706 30 |
| Type of flame retardar *3 Amount | " | — | Br—PPO 30 | Br—PSt 28 | Br—PPO 30 | Br—PSt 32 |
| Type of flame retarder assistant *4 Amount | " | — | Sb₂O₃ 7 | Sb₂O₃ 7 | Sb₂O₃ 7 | Sb₂O₃ 8 |
| Type of ion capturing agent *5 Amount | " | — | — | — | — | — |
| Type of heat resistant improver *6 Amount | " | CuI/KI 0.03/0.2 | — | — | — | — |
| Melt viscosity μa10 | Poise | 105000 | 61000 | 82000 | 71100 | 90000 |
| Melt viscosity μa1000 | " | 9000 | 8000 | 9000 | 8800 | 9500 |
| μa10/μa1000 |  |  | 7.6 | 9.1 | 8.1 | 9.5 |
| Molded product characteristic |  |  |  |  |  |  |
|  |  |  |  |  |  |  |
| Blow Moldability |  | Poor | Poor | Poor | Poor | Poor |
| Molded Product Appearance |  | " | " | " | " | " |
| Foul Odor During Molding |  | None | Present | Present | Present | Present |
| Elastomer Mean Particle Size | μm | 1.5 | — | 2.0 | — | 1.8 |
| Izod Impact Strength (notched) | kgf cm/cm |  |  |  |  |  |
| HDT (18.6 kgf/cm²) | °C. |  |  |  |  |  |
| (4.6 kgf/cm²) | °C. | — | — | — | — | — |
| Flame Resistance | UL-94 | — | V-1 | V-2 | V-1 | V-2 |

We claim:

1. A process for producing a molded product having excellent heat resistance, which comprises:
   forming a composition comprising a crystalline polyamide by mixing together a crystalline polyamide comprising: (a) 50–90% by weight of a hexamethylene adipamide component, (b) 5–40% by weight of a hexamethylene terephthalamide component, and (c) 5–30% by weight of a hexamethylene isophthalamide component, components (a), (b) and (c) being based on the weight of the crystalline polyamide, and 1–150 parts by weight of an elastomer, based upon 100 parts by weight of the crystalline polyamide;
   melting said composition to form a melt polymer and applying shear to said melt polymer, the melting point (Tm) and crystallization temperature (Tc) of the crystalline polyamide being Tm≧225° C. and Tc≦230° C., respectively, and the melt viscosity of said crystalline polyamide varying greatly depending on the shear rate applied to said melt polymer and satisfying formulae (I) and (II):

$$2,000,000 \geq \mu a10 \geq 2,000 \tag{I}$$

$$\mu a10/\mu a1000 \geq 3.3 \tag{II}$$

wherein:
  Tm: melting point of said polyamide (°C.)
  μa10: melt viscosity at a temperature of Tm+20° C. and a shear rate of 10 (1/sec) (poise)
  μa1000: melt viscosity at a temperature of Tm+20° C. and a shear rate of 1000 (1/sec) (poise); and
  forming a parison from said melt polymer and blow molding the parison to form said molded product.

2. A process as claimed in claim 1, wherein the amount of elastomer is 5–100 parts by weight.

3. A process as claimed in claim 1, wherein the elastomer is an ethylene-based ionomer resin.

4. A process as claimed in claim 3, wherein the ethylene-based ionomer is an ionic polymer in which a metal ion having a valency of 1–3 is added to a copolymer of ethylene and one unsaturated carboxylic acid selected from the group consisting of acrylic acid, methacrylic acid and itaconic acid.

5. A process as claimed in claim 4, wherein the metal ion is one metal ion selected from the group consisting of $Na^+$, $Zn^{++}$ and $Al^{+++}$.

6. A process as claimed in claim 1, wherein the elastomer is a modified polyolefin obtained by copolymerization with at least one modifier selected from the group consisting of maleic acid, fumaric acid, itaconic acid, (meth) acrylic acid, crotonic acid, their anhydrides or derivatives, maleimide and epoxy compounds into a polymer obtained by radical polymerization of at least one compound having a polymerizable double bond selected from the group consisting of ethylene, propylene, butene-1, butadiene, isoprene, 1,3-pentadiene, pentene-1, 4-methylpentene-1, isobutylene, 1,4-hexadiene, dicyclopentadiene, 2,5-norbornene, 5-ethylidenenorbornene, 5-ethyl-2,5-norbornadiene, 5-(1'-propenyl)-2-norbornene, styrene, α-methylstyrene and vinyltoluene.

7. A process as claimed in claim 6, wherein the amount of modifier added is 0.001–40 mol % with respect to the polyolefin.

8. A process as claimed in claim 6, wherein the amount of modifier added is 0.05–20 mol % with respect to the polyolefin.

9. A process as claimed in claim 6, wherein the modified polyolefin is at least one polymer selected from the group consisting of styrene/ethylene butylene/styrene-g-maleic anhydride block copolymer obtained by grafting maleic anhydride after hydrogenation of styrene/butadiene/styrene block copolymer and styrene/isoprene-g-maleic anhydride block copolymer, ethylene/ethyl acrylate-g-maleic anhydride copolymer, ethylene/ethyl methacrylate-g-maleic anhydride copolymer, ethylene/ethyl acrylate-g-maleimide copolymer, ethylene/ethyl acrylate-g-N-phenylmaleimide copolymer, ethylene/propylene-g-maleic anhydride copolymer, ethylene/butene-1-g-maleic anhydride copolymer, ethylene/propylene/1,4-hexadiene-g-maleic anhydride copolymer, ethylene/propylene/dicyclopentadiene-g-maleic anhydride copolymer, ethylene/propylene/2,5-norbornadiene-g-maleic anhydride copolymer, ethylene/propylene-g-N-phenylmaleimide copolymer, ethylene/butene-1-g-N-phenylmaleimide copolymer, and styrene/butadiene/styrene-g-maleic anhydride block copolymer, wherein "g" represents graft.

10. A process as claimed in claim 9, wherein the modified polyolefin is at least one polymer selected from the group consisting of ethylene/ethyl acrylate-g-maleic anhydride copolymer, ethylene/propylene-g-maleic anhydride copolymer, ethylene/propylene/ 1, 4-hexadiene-g-maleic anhydride copolymer, ethylene/propylene-g-N-phenylmaleimide copolymer, styrene/butadiene/styrene-g-maleic anhydride block copolymer, and styrene/ethylene-butylene/styrene-g-maleic anhydride block copolymer wherein "g" represents graft.

11. A process as claimed in claim 1, wherein the elastomer is at least one polymer selected from the group consisting of ethylene/glycidylacrylate copolymer and ethylene/glycidylmethacrylate copolymer.

* * * * *